Figure 1:
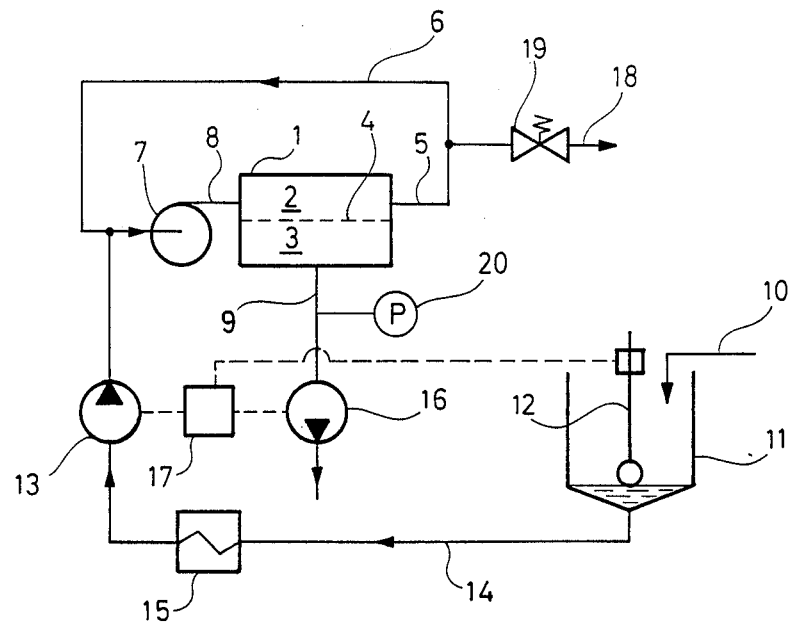

United States Patent [19]

Lidman

[11] Patent Number: 4,800,808
[45] Date of Patent: Jan. 31, 1989

[54] APPARATUS FOR PRODUCTION OF MILK CONCENTRATE

[75] Inventor: Magnus Lidman, Tumba, Sweden

[73] Assignee: Alfa-Laval Agri International AB, Tumba, Sweden

[21] Appl. No.: 55,050

[22] Filed: May 28, 1987

Related U.S. Application Data

[63] Continuation-in-part of Ser. No. 834,246, Dec. 17, 1985, abandoned.

[30] Foreign Application Priority Data

Jun. 1, 1984 [SE] Sweden ................................. 8402970
May 28, 1985 [WO] PCT Int'l Appl. .... PCT/SE85/00222

[51] Int. Cl.[4] .............................. A23C 1/00; A23C 9/00
[52] U.S. Cl. ........................................ 99/453; 99/455; 99/456; 210/637; 210/647; 210/650
[58] Field of Search ................................. 99/452–455, 99/456, 459, 460, 483, 470; 210/637, 647, 651, 650, 90; 426/587; 422/256

[56] References Cited

U.S. PATENT DOCUMENTS

| | | | |
|---|---|---|---|
| 4,113,614 | 9/1978 | Rollo et al. | 210/647 X |
| 4,191,182 | 3/1980 | Popovich et al. | 210/651 |
| 4,253,386 | 3/1981 | Egnell | 99/453 |
| 4,390,350 | 6/1983 | Palm | 99/453 |
| 4,479,423 | 10/1984 | Schwitters et al. | 99/455 |

Primary Examiner—Timothy F. Simone
Attorney, Agent, or Firm—Cyrus S. Hapgood

[57] ABSTRACT

In order to produce a milk concentrate by membrane filtration of the milk produced at a milking plant the milk is during the milking continuously led to the concentrate space (2) of a member filter unit (1) possibly after heating to a temperature of 50°–70° C. The degree of concentration of the outgoing concentrate from the concentrate space is determined in that two positive pumps (13, 16) are arranged to work at a constant internal relation in capacity each arranged to control a flow chosen among arriving milk flow to the concentrate space (2), outgoing concentrate flow from the concentrate space (2) and outgoing permeate flow from the permeate space (3) of the membrane filter unit (1).

16 Claims, 3 Drawing Sheets

APPARATUS FOR PRODUCTION OF MILK CONCENTRATE

This application is a continuation-in-part of my copending application Ser. No. 834,246 filed Dec. 17, 1985, and entitled "Method and Arrangement for Production of Milk Concentrate" (now abandoned). Said copending application describes and claims an invention described and claimed in International Application No. PCT/SE85/00222 filed May 28, 1985, claiming priority based upon Swedish application 8402970-1 filed June 1, 1984.

The present invention relates to a method and apparatus for production of a milk concentrate by way of membrane filtration of milk obtained at a milking plant.

Concentration of milk by way of ultra filtration is today a usual procedure in dairies, for example, in connection with production of cheese. Due to the fast development toward cheaper and safer filter modules and membrane materials, there have been investigations on the possibility of carrying through the concentration of the milk (or at least a preconcentration) directly at the milking plant in order to reduce the volumes which must be transported further to dairies. In order to achieve a suitable membrane filtration process for this purpose, a number of special requirements must be met. In order to obtain a milk product with a microbiologically high quality, there are elaborate standards for handling the milk on the farms in order to achieve a short period from milking until the milk is cooled to a temperature of about 4° C. If a process for concentration of milk is inserted between the milking step and the cooling step, it is essential to obtain as little increase as possible of the holding time of the milk in the very dangerous temperature field of 37°–20° C.

It is also desirable or in the future there will be a demand that a milk concentrate produced on the farm have a certain standardized degree of concentration in order to minimize the need for determination of the content when delivering to dairies so that only sample controls have to be taken. The demand of having a certain degree of concentration must also be considered against the background that equipment for concentrating the milk on the farm must be simple to handle in order to be used by personnel without any specific education, and the filtration plant must be so simple that the cost for the plant can be paid by obtaining a higher price for the concentrated product in relation to unconcentrated milk.

It is also necessary to consider the quality of the milk in relation to the control equipment of the filtration plant. The quality of the milk depends on the mechanical treatment of the milk. A mechanical mal-treatment of the milk may among other things destroy the protein membranes around the fat globules in the milk. That is one reason for choosing a careful control equipment.

If only the aim to obtain an easily controlled concentration degree by using a simple apparatus is considered, a membrane filtration plant working batchwise is the most suitable. The milk is collected in a batch and circulated through the membrane filtration unit until the desired amount of permeate is removed. The remaining milk concentrate is transferred to a cooling tank. This method, however, has two evident drawbacks. Firstly, the treatment time is long, which of course influences the quality of the milk. Secondly, the whole amount of concentrate is transferred to the cooling tank in a very short time, which means that the holding time for the milk at the dangerous temperature range is prolonged. It should also be observed that concentration of milk by way of ultra filtration takes place in the best way at a temperature of 50°–60° C., which in a batch procedure may mean that already cooled concentrate in the cooling tank together with a newly added amount reaches a mixing temperature within the dangerous range mentioned above. Flow control is normally used in combination with measuring of the concentration in conventional membrane filter plants which work continuously. The incoming flow is controlled in such a way that the filter units work with an optimal capacity. Apart from the fact that measurements of the flow and of the concentration, which usually are carried through by refractometer, imply a relatively expensive control equipment, this, within the ultra filtration technique usual control method, is very sensitive and must be handled by a specially educated staff. Also, since the instantaneous production of milk may vary in a large degree during the milking, depending on whether high milking or low milking animals are milked during a certain time, there is sometimes needed an intermediate storing of considerable amounts of milk in order to be able to filtrate the milk at a constant capacity. The alternative is to adapt the capacity of the filter unit to the instantaneously produced milk flow.

The principal object of the present invention is to achieve a method and apparatus for membrane filtering of milk produced at a milking plant such that the problems mentioned above with a prolonged keeping time between the milking and the cold storage are eliminated and a certain determined degree of concentration is obtained by means of a simple and secure apparatus.

Another object of the invention is to achieve a method of controlling a membrane filter plant producing milk concentrate such that the capacity of the plant may easily be adapted to the instantaneously produced milk flow while maintaining an exact degree of concentration without the use of the sensitive and expensive control apparatus mentioned above.

These objects have been achieved according to the invention by a method of the kind mentioned in the introduction, which method is mainly characterized in that the milk flow produced during the milking is continuously led to the concentrate room in the membrane filter unit, possibly after a heating to a temperature of 50°–70° C., and in that the degree of concentration in the concentrate obtained from said concentrate room is determined by using two positive pumps arranged to work at a constant relative capacity and each of which controls a flow chosen among (a) the milk flow led to the concentrate room, (b) the concentrate flow obtained from the concentrate room and (c) the permeate flow leading from the permeate room in the membrane filter unit.

According to the invention, there is achieved a particularly simple control of the concentration by co-ordinating two positive pumps, each controlling one flow, to produce flows which have a certain relation to each other. The co-ordination usually takes place mechanically by way of a common driving shaft or driving mechanism, but other forms of synchronization are possible. Bearing in mind that the filter plant should be operated by usual milking personnel without the risk of variations of concentration in the produced concentrate, controlling the ratio by means of two positive pumps constitutes a very effective and particularly secure solution.

For the special purpose of adapting the capacity of the filtration unit to the instantaneous production of milk, the control of the ratio between the two flows by way of two positive pumps constitutes a simple and advantageous solution in that the control of the load of the filter unit may be carried through without any influence on the predetermined relation of capacity of the two pumps. The total capacity of the pumps may be varied by way of a common driving system, as by changing the rotational speed of the pumps, frequency of the strokes or volume of the strokes, so that the capacity can be adapted to the amount of arriving milk without changing their relative capacity. The total capacity of the pumps may easily be controlled by the level in a storage tank for produced milk. The method of controlling also implies a careful treatment of the milk in that the need for using flow regulating throttle valves is eliminated. The control of the total capacity of the two pumps may, in a simplified arrangement according to the invention, also take place manually, as by adjusting the rotational speed of the pumps with a mechanical variator or similar means. Such a simple control may be sufficient at milking plants where the variation in the produced amount of milk is mainly of a seasonal character, as when the main number of animals are in the same lactation period. Anyhow, an automatic means for shutting off the filter plant or for sending an alarm signal must always be provided, which starts to function when the milk in a storage tank prior to the filter plant is below a certain level.

Figure 2:
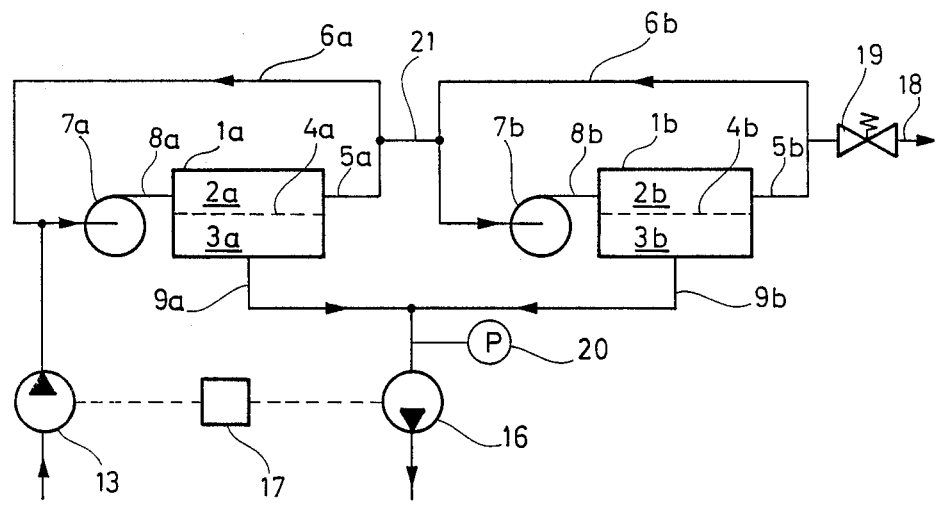
Figure 3:
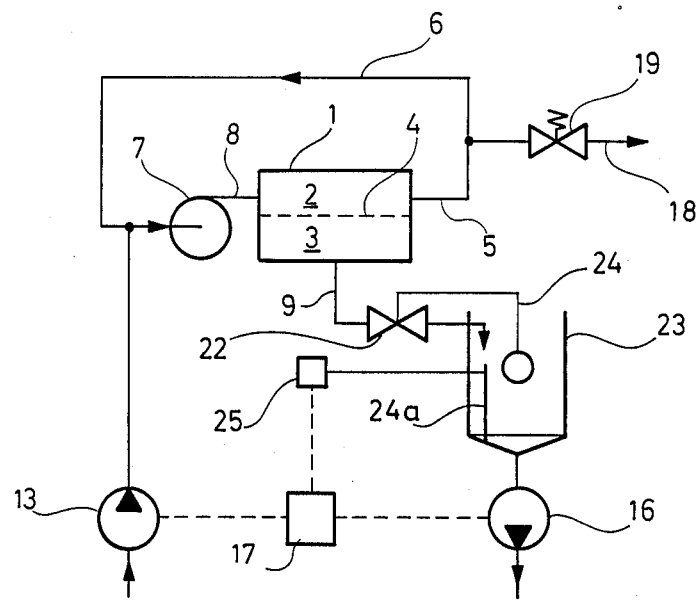
Figure 4:
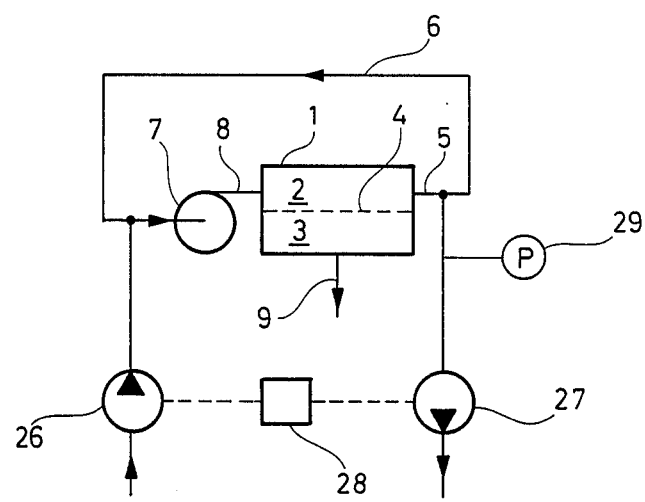
Figure 5:
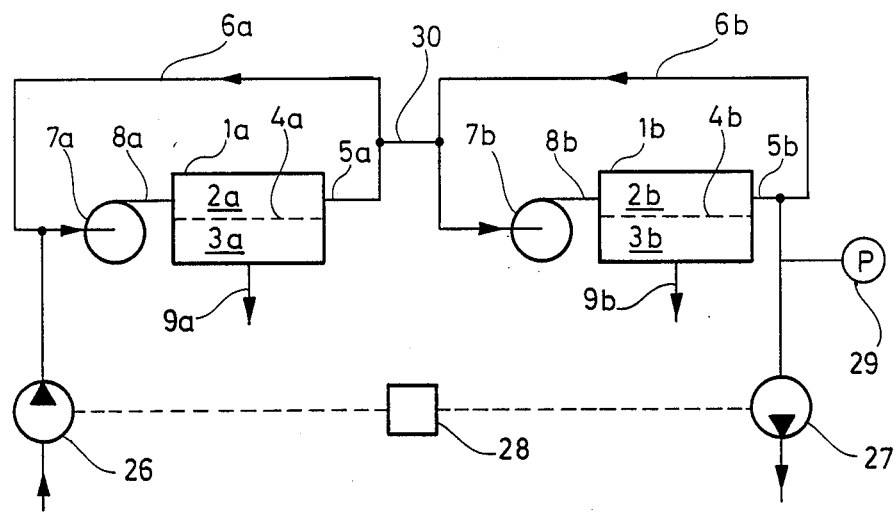
Figure 6:
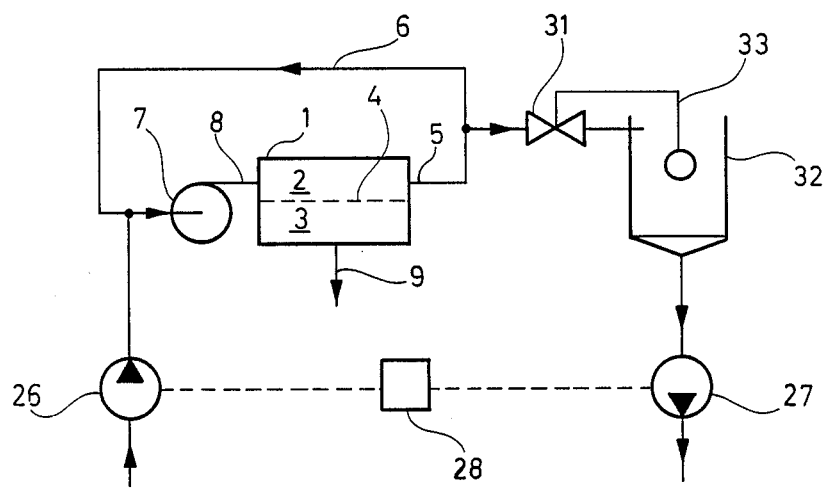

When, according to the invention, two positive pumps are arranged to control two of the three flows chosen among arriving milk flow, outgoing concentrate flow and the outgoing permeate flow, it is seen that three separate alternatives are possible. A first alternative is to control the arriving flow and the permeate flow, a second alternative is to control the arriving flow and the outgoing concentrate flow and a third alternative is to control the outgoing concentrate flow and the outgoing permeate flow. Of these three alternatives, one of the first two mentioned is preferred, and these two embodiments will be described further in the following with reference to the attached drawings in which:

FIG. 1 is a flow chart over a membrane filter plant, in which two positive pumps control arriving milk flow and outgoing permeate flow, FIG. 2 is a flow chart of a plant with two filter units connected in series and with the same location of the two positive pumps as in FIG. 1;

FIG. 3 shows a modified embodiment of the plant in FIG. 1 with the same location of the two positive pumps, FIG. 4 shows a filter plant in which the two positive pumps control the arriving milk flow and the outgoing concentrate flow, FIG. 5 shows a plant with two filter units connected in series, and with the same location of the two positive pumps as in FIG. 4, and FIG. 6 shows a modification of the plant according to FIG. 4 with the same location of the two positive pumps.

In all of FIGS. 1–6 there is a membrane filter unit 1 with a separate concentrate space 2 and a permeate space 3 and a membrane 4. From an outlet 5 from the concentrate space 2 a recirculation pipe 6 leads by way of a circulation pump 7 to an inlet 8 to the concentrate space 2. The permeate space 3 is provided with a permeate outlet 9. In FIG. 2 and FIG. 5, which show plants with two filter units connected in series, the corresponding reference numerals in the first filter units have been given the addition "a" and the corresponding reference numerals in the second filter unit have been given the addition "b".

In the plant shown in FIG. 1, milk produced in the milking plant arrives by way of a pipe 10 to a storage tank 11 provided with a level sensor 12. Milk flow arriving at the filter unit 1 is controlled by way of a first positive pump 13, which pumps milk from the storage tank 11 by way of a pipe 14 and a heat exchanger 15, in which the milk is heated to a temperature suitable for the membrane filtration, usually in the range of 50°–70° C. A second positive pump 16 controls the permeate flow from the permeate space 3 through the permeate outlet 9. The two positive pumps 13 and 16 are driven by a common driving system 17 in such a way that they work at a constant internal relation. The driving unit 17 may suitably comprise an electrical motor which is connected to a common driving shaft for the two positive pumps. The total capacity of the pumps 13 and 16 is controlled by the level sensor 12 in the storage tank 11, as by varying the rotational speed of the motor.

In order to hinder leakage by way of the pump 13 and an outlet pipe 18 from the concentrate space 2, there is a pressure control valve 19 arranged in the pipe 18. In order to supervise the capacity and condition of the filter membrane 4, a pressure sensing means 20 is arranged between the permeate outlet 9 and the positive pump 16. When the capacity of the filter is exceeded, as by filling up, the pressure in the permeate space diminishes, which is registered by the pressure sensing means 20, which maybe a manometer or a pressure switch. The pressure sensing means 20 may be arranged to control and reduce the capacity of the pumps 13 and 16 by way of the common control system 17.

FIG. 2 shows another embodiment of the plant in FIG. 1 with two filter units 1a and 1b connected in series. The connection in series of the two filter units 1a and 1b takes place by way of a connection pipe 21 between the recirculation pipe 6a of the unit 1a and the recirculation pipe 6b of the unit 1b. The positive pumps 13 and 16 with the common driving means 17, the pressure control valve 19 and the pressure sensing means 20 have the same principal position and function as in the plant according to FIG. 1 and have been given the same reference numerals. The positive pump 16 is, however, connected to both the outlet for permeate 9a from the filter unit 1a and the outlet for permeate 9b from the filter unit 1b.

FIG. 3 shows a modification of the plant according to FIG. 1 and differs from the same in that the outlet 9 from the permeate space 3 by way of a valve means 22 leads to a container 23 with a level sensor 24 which opens and closes the valve means 22, and in that the positive pump 16 which controls the flow of permeate is arranged to continuously lead away permeate from the container 23. In order to control the maximum capacity and condition of the filter membrane 4, a second level sensing means 24a is arranged in the container 23. When the positive pump 16 has pumped out a larger flow of permeate than the filter unit 1 may produce, the level in the container 23 sinks under the control field of the level sensor 24. It is then the task of the level sensor 24a to give alarm or adapt the total capacity of the pumps 13 and 16. Such adaption may, for example, be achieved in that the pressure sensor 20, by way of a tyristor 25 or some other signal modifier, is arranged to influence the common driving system 17 of the pumps 13 and 16 in order to reduce the total capacity of the pumps. Thus, the apparatus of FIG. 3 provides means 22, 23, 24 and 24a for sensing when the permeate flow rate exceeds the maximum within the capacity of the filter unit; and through a connection 25 this sensing means acts on interconnecting means 17 to reduce the total capacity of pumps 13 and 16 in response to said permeate flow exceeding said maximum rate.

In the flow chart of FIG. 4, a first positive pump 26 is arranged to control the arriving milk flow to the filter unit 1, while a second positive pump 27 is arranged to control the outgoing flow of concentrate from the concentrate space 2. The common driving means for the pumps 26 and 27 has the numeral 28. In this case the outlet 9 for permeate opens at atmospheric pressure whereas the supervision of the capacity and condition of the filter membrane 4 takes place by means of a pressure sensing means 29 in the concentrate space 2. If the filter capacity does not correspond to the capacity of the pumps 26 and 27, the pressure on the concentrate space 2 rises, and the pressure sensing means 29 is connected to an alarm means or a switch. The pressure sensing means 29 may also be arranged to influence the common driving means 28 of the pumps 26 and 27 at a certain pressure such that the capacity of the pumps is reduced.

FIG. 5 shows the same plant as in FIG. 4 with the exception that two filter units 1a and 1b connected in series are included. The two filter units are connected in series in that the circulation pipe 6a for the filter unit 1a is connected to the circulation pipe 6b for the filter unit 1b by way of a pipe 30. The positive pump 27 which leads concentrate away from the plant is connected to the outlet 5b of concentrate from the second filter unit 1b.

FIG. 6 shows a modification of the plant in FIG. 4. In FIG. 6, the outlet from the concentrate space 2 leads by way of a valve means 31 to a container 32 with a level sensor 33 which opens and closes the valve means 31, and the positive pump 27 which controls the flow of concentrate is arranged to continuously lead away concentrate from the container 32. This embodiment has the advantage that the pressure at the inlet of the pump 27 is constant. The pump can therefore work at constant pressure conditions, since the counter pressure also can be held constant, and a good exact determination may be obtained in that the internal leakage of the pump is constant. This advantage is present also in the embodiment of FIG. 3

As will be understood from the foregoing, concentrate space 2 has an outlet 5, 18, for discharging a concentrate flow from the apparatus, and permeate space 3 has outlet 9 for discharging a permeate flow. The two positive pumps 13 and 16 (or 26-27) are positioned to control respective flows selected from the concentrate flow, the permeate flow and the milk flow from the milking plant through pipe 14 to concentrate space 2. Through the interconnecting means 17 or 28, the two positive pumps are operated at a constant internal relation of capacity to discharge the concentrate flow through outlet 5, 18 at a rate substantially lower than the rate of said milk flow. Normally, the concentrate discharge rate through outlet 5, 18 will equal the rate of milk flow through pipe 14 (FIG. 1) less the rate at which permeate is discharged through outlet 9.

As shown in FIGS. 1 and 3, concentrate discharge pipe 18 is a branch from outlet pipe 5. The other branch is a recirculating pipe 6 leading back to inlet 8 and which therefore cannot affect the sum of the discharge rates through concentrate outlet 5, 18 and permeate outlet 9. The latter sum, of course, depends upon the incoming flow rate from the milking plant through pipe 14.

It should be noted that the degree to which the milk is concentrated in space 2 will be determined by the difference in the capacities of the two positive pumps.

I claim:

1. In an apparatus for producing a milk concentrate by membrane filtration of the milk produced at a milking plant, said apparatus comprising a filter unit (1) having a permeate space (3), a concentrate space (2) and a membrane (4) separating said spaces, and means (14) for leading a flow of said milk from the milking plant to the concentrate space by way of an inlet (8), said concentrate space having an outlet (5, 18) for discharging a concentrate flow from the apparatus, said permeate space having an outlet (9) for discharging a permeate flow, the improvement comprising two positive pumps (13, 16; 26, 27) positioned to control respective flows selected from said milk flow, concentrate flow and permeate flow, and means (17, 28) interconnecting said pumps for operating them at a constant internal relation of capacity while discharging said concentrate flow at a rate substantially lower than the rate of said milk flow, said two pumps having a substantial difference in their respective capacities, the degree to which the milk is concentrated depending upon the amount of said difference.

2. The improvement of claim 1, in which one of said positive pumps (13) is positioned to control said milk flow, the second positive pump (16) being positioned to control said permeate flow, the improvement comprising also a pressure controlling valve (19) associated with said concentrate outlet (5, 18) for opening the same when a predetermined pressure is reached in the concentrate space.

3. The improvement of claim 2, comprising also pressure sensing means (20) communicating with the permeate space (3) and operable to signal when the maximum capacity of the filter unit is exceeded.

4. The improvement of claim 2, comprising also a container (23), valve means (22) through which said permeate outlet (9) leads to the container, and means (24) for sensing the liquid level in the container and operatively connected to said valve means (22) to open and close the same, said second positive pump (16) being positioned to lead permeate away from said container.

5. The improvement of claim 2, comprising also sensing means (22, 23, 24, 24a) associated with said second positive pump (16) for sensing when said permeate flow exceeds the maximum rate within the capacity of said filter unit (1), and a connection (25) through which said sensing means are operable on said interconnecting means (17) to reduce the total capacity of the positive pumps (13, 16) in response to said permeate flow exceeding said maximum rate.

6. The improvement of claim 5, in which said sensing means includes a container (23) to which said permeate outlet (9) leads, said second positive pump (16) being operable to lead permeate continuously away from the container, said sensing means also including a level sensor (24a) for sensing when the liquid level in the container sinks below a predetermined level.

7. The improvement of claim 1, in which one of said positive pumps (26) is positioned to control said milk flow from the milking plant, the second positive pump (27) being positioned to control said concentrate flow from the apparatus.

8. The improvement of claim 7, comprising also pressure sensing means (29) communicating with the concentrate space (2) and operable to signal when the maximum capacity of the filter unit is exceeded.

9. The improvement of claim 7, comprising also a container (32), valve means (31) through which said concentrate outlet leads to the container, and means (33) for sensing the liquid level in the container and operatively connected to said valve means (31) to open and close the same, said second positive pump (27) being positioned to lead concentrate away from said container.

10. The improvement of claim 1, comprising also means for heating said milk flow to a temperature of 50°–70° C.

11. The improvement of claim 1, in which said interconnecting means include a common driving system for the pumps.

12. The improvement of claim 1, comprising also a circulation pipe (6) between said concentrate outlet (5, 18) and said milk inlet (8) to the concentration space, and a circulation pump (7) in said pipe.

13. The improvement of claim 1, comprising also control means (10–12) operable through said interconnecting means (17) to control the total capacity of said two positive pumps in relation to the rate of milk flow produced at the milking plant, said control means acting to limit the driving pressure over said membrane and thereby prevent overloading of the filter unit.

14. The improvement of claim 13, in which said control means includes a container (11) through which said flow of milk passes from the milking plant, and means (12) for sensing the liquid level in the container and operatively connected to said interconnecting means (17).

15. The improvement of claim 1, comprising also means responsive to variations in the rate of said milk flow for adjusting the total capacity of said two positive pumps.

16. The improvement of claim 1, in which said interconnecting means are operable through the two positive pumps to discharge said concentrate flow at a rate equal to said milk flow rate less the rate of said permeate flow.

* * * * *